United States Patent [19]
Hertz, Jr.

[11] 4,185,840
[45] Jan. 29, 1980

[54] MULTILAYER SEAL
[75] Inventor: Daniel L. Hertz, Jr., Red Bank, N.J.
[73] Assignee: Seals Eastern Inc., Red Bank, N.J.
[21] Appl. No.: 904,652
[22] Filed: May 10, 1978
[51] Int. Cl.² ............................................. F16J 15/20
[52] U.S. Cl. ...................................... 277/125; 92/250
[58] Field of Search .................. 92/250, 248, 249; 277/123, 124, 125, 188, 188 A, 235, 235 A

[56] References Cited
U.S. PATENT DOCUMENTS

| | | | |
|---|---|---|---|
| 2,009,423 | 7/1935 | Wheeler | 277/123 |
| 2,676,075 | 4/1954 | Stone | 277/235 |
| 3,318,607 | 5/1967 | Wilson | 277/235 |
| 3,469,855 | 9/1969 | Enting | 277/235 R |

*Primary Examiner*—Robert I. Smith
*Attorney, Agent, or Firm*—Alan H. Levine

[57] ABSTRACT

A multilayer seal comprising a stack of rings, some being made of elastomeric material and some being made of more rigid material, such as a metal. The elastomeric and rigid rings alternate in the axial direction of the stack, and the elastomeric rings are progressively thinner in the axial direction of the stack. Each ring is preferably bonded to the next successive ring in the stack. When the seal is in place between two opposed surfaces to be sealed against fluid pressure, the thickest of the elastomeric rings is arranged nearest the higher pressure end of the opposed surfaces.

7 Claims, 2 Drawing Figures

U.S. Patent  Jan. 29, 1980  4,185,840
FIG.1
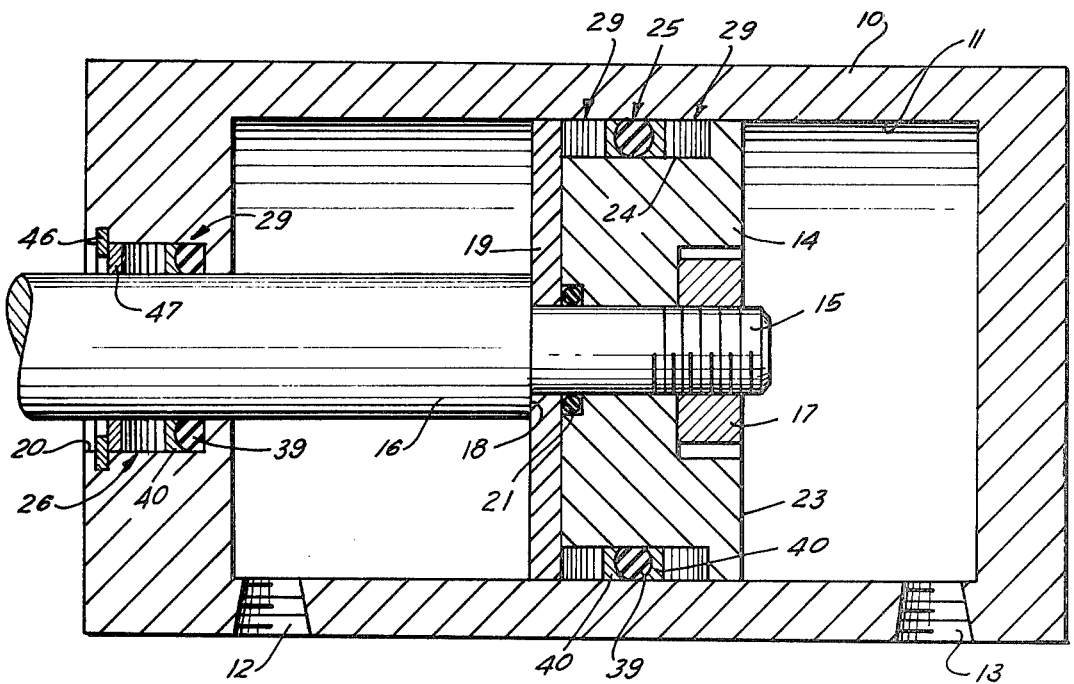
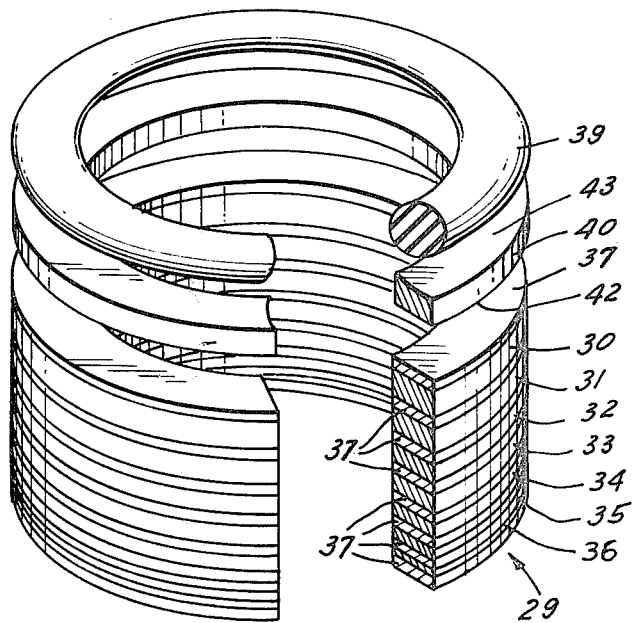
FIG.2

MULTILAYER SEAL

This invention relates to seals, sometimes called packings, used to provide a fluid tight seal between two opposed surfaces, the surfaces usually being metal and movable with respect to each other.

Such seals are ordinarily of annular or hollow cylindrical shape, and are made of rubber, plastics, and other natural and synthetic polymers. The seals fit very tightly between the opposed surfaces to be sealed, and as pressure increases during use, the seals deform to increase the sealing effect. Some packings are often resiliently loaded, such as by a spring, to pressurize the packing and insure a good seal even at low pressures.

The fluid pressure on a hollow cylindrical packing is in an axial direction. Since the packing cannot move axially except to the extent it is compressed, it translates the axially applied fluid pressure into increased radial pressure against the surfaces between which the packing is located. The fluid pressure is, of course, higher at one end of the seal than at the other, and it happens that the pressure distribution in the seal from one end to the other is not uniform. Instead, the radial pressure is the least at the end of the seal closest to the high fluid pressure and increases exponentially toward the end of the seal furthest from the high fluid pressure. This phenomenon is illustrated and described on page 143 of the Jan. 20, 1977 issue of "Machine Design" magazine.

The non-uniform distribution of radial packing pressure is ordinarily not a problem at relatively low temperatures and pressures (e.g., below 3000 p.s.i.) because the elastomeric nature of the seal material accommodates for it. However, when polymer seals are used in high temperature applications, the elevated temperature causes the seal material to have greatly reduced physical qualities, and hence less able to accommodate for the non-uniform radial pressure distribution. This eventually leads to seal failure.

It is an object of the present invention to overcome this problem by providing a seal or packing within which there is a more uniform radial pressure distribution, so that it remains useful throughout the temperature range at which the polymer of which the seal is made is stable, and even at very high pressure differentials, e.g., from vacuum to 40,000 p.s.i.

The invention is predicated upon an understanding that the compression modulus of a polymer piece is proportional to the "shape factor" of the piece. This relationship is illustrated on page 34 of a booklet entitled "Engineering Design With Natural Rubber", Fourth Edition, 1974, published by The Malaysian Rubber Producers' Research Association, London, England. The term "shape factor" represents the ratio of the loaded area of the polymer piece, i.e., the surface transverse to the axial direction of the seal, to the force free areas of the piece, i.e., the surfaces parallel to the axial direction of the seal. What this means is that for the same loaded area, the thinner the seal in an axial direction, the greater its shape factor and the greater its compression modulus.

With this in mind, it is another object of the present invention to provide a packing in which the compression modulus increases exponentially with distance from the region of high fluid pressure, so as to compensate for the increase in radial pressure distribution experienced by the packing. This objective is accomplished, according to the invention, by employing a packing which is a composite of elastomeric rings having progressively greater shape factors as the rings get further from the high pressure region. For rings of uniform face area, progressively greater shape factors are accomplished by making the rings progressively thinner. As a result, each ring is extruded outwardly to about the same degree, thereby reducing uneven wear on the seal along its length.

A feature of the invention is the use of high compression modulus stiffeners, e.g., metal rings, between each successive pair of elastomeric rings, so that the plurality of elastomeric rings do not behave as a single elastomeric packing with the usual non-uniform radial pressure distribution. The effect of the use of the more rigid metal rings is enhanced if they are permanently bonded to the elastomeric rings which they engage, so as to form a unitary stack of alternating elastomeric and more rigid rings.

Additional objects and features of the invention will be apparent from the following description in which reference is made to the accompanying drawings.

In the drawings:

FIG. 1 is a schematic longitudinal cross-sectional view through a fluid operated piston-cylinder device incorporating seals according to this invention; and FIG. 2 is an exploded perspective view, on a larger scale and with a part broken away of the seal according to this invention.

For the sake of illustration, FIG. 1 shows seals according to the present invention incorporated in a piston-cylinder device. It is understood, however, that such seals may be used in a wide variety of apparatus, and are particularly useful as dynamic seals between two relatively moving parts, especially metal parts. The relative movement may be translational, as illustrated, or rotational.

The piston-cylinder device includes a cylinder 10 having an internal bore 11 and two ports 12 and 13 in its side wall. A piston 14 is slidable axially within bore 11 and is mounted on the reduced diameter end 15 of a piston rod 16. End 15 is threaded, and a nut 17, threaded on to that end, holds piston 14 tightly against a shoulder 18 of the piston rod 16. An O-ring seal 21, within an enlarged bore in piston 14, surrounds piston rod end 15 and prevents leakage of fluid, from one face of the piston to the other, between the end 15 and the piston. A circular plate 19, having a diameter about equal to or slightly less than the diameter of bore 11, is located between piston 14 and shoulder 18. Piston rod 16 extends slidably through a hole 20 in one end wall of cylinder 10.

In use, a high pressure fluid, such as compressed air or oil, is applied to port 12 and exhausted from port 13, to move piston 14 and rod 16 toward the right in FIG. 1. Thereafter, the high pressure fluid is applied to port 13 and exhausted from port 12 to move piston 14 and rod 16 toward the left. This operation is, of course, entirely conventional.

At one end 23, the diameter of piston 14 is about equal to or slightly less than the diameter of bore 11. Between that end and plate 19, the diameter of the piston is reduced to provide an annular groove 24 for accommodating a seal 25. The diameter of hole 20 is made considerably larger, for most of its length, than the diameter of piston rod 16, to provide an annular region for accommodating a seal 26. Seals 25 and 26 are formed according to the present invention.

As best seen in FIG. 2, each seal includes a stack 29 of elastomeric rings 30, 31, 32, 33, 34, 35, and 36 alternating in the stack with rings 37 of a high compression modulus material such as metal. Although seven elastomeric rings are shown in the present example, more or fewer could be used. Preferably, each of the rings 30-37 is permanently bonded, such as by a suitable adhesive, to the ring or rings which it engages, so that all the rings 30-37 form a unitary seal assembly. Furthermore, it is advantageous for the two endmost rings of the stack 29 to be metal rings 37 so that the ends of the seal are rigid and wear-resistant.

It will be seen that elastomeric rings 30-36 are progressively thinner in the axial direction of the stack, i.e., ring 31 is thinner than ring 30, ring 32 is thinner than ring 31, ring 33 is thinner than ring 32, etc. Metal rings 37 may, however, all be of the same thickness.

Seal 25 carried by piston 14 includes two ring stacks 29 in tandem. Between the stacks is a conventional O-ring 39 of elastomeric material, and between the O-ring and each stack is a back-up ring 40 of a relatively stiff material, such as a suitable plastic. O-ring 39 only minimally, if at all, augments the sealing effect of stacks 29; the primary purpose of the O-ring is to apply a resilient axial load to stacks 29. Therefore, O-ring 39 could be replaced by any suitable resilient means capable of axially loading stacks 29. Each back-up ring 40 has one flat face 42 engaging the end ring 36 of its respective stack, and one concave face 43 providing a seat accommodating O-ring 39.

In seal 25, thickest rings 30 of stacks 29 are closer to O-ring 39, and thinnest rings 36 are closer to the end faces of piston 14 and plate 19. When piston 14 is moving toward the right, i.e, high pressure fluid to the left of the piston, the stack 29 to the right of O-ring 39 serves as the primary seal between the piston and cylinder wall. When piston 14 moves toward the left, i.e., high pressure fluid to the right of the piston, the stack 29 to the left of O-ring 39 serves as the primary seal. Thus, during piston movement, the end of each operative stack 29 having the thickest ring 30 is closer to the region of high pressure than the end of the stack having the thinnest ring 36. Consequently, the non-uniform radial pressure distribution usually encountered in seals in such a location is compensated for, and the radial pressure distribution within each stack 29 is substantially uniform. As a result, no one of the rings 30-36 will be extruded radially to a greater extent than any other, and hence no one ring will wear out faster by sliding engagement with the wall of bore 11.

Stack 29 of seal 26 is also assembled with an O-ring 39 and back-up ring 40, the O-ring serving to resiliently axially load the stack. A snap ring 46, fitting into an annular groove in the wall of hole 20, keeps seal 26 in place, a spacer 47 being located between snap ring 46 and the end of stack 29. In seal 26, the end of stack 29 having thickest ring 30 is closer to O-ring 39 because in this way it is closer to the high pressure region within bore 11.

The particular dimensions of rings 30-37 will depend upon the materials used to fabricate them and the environment in which the seal will be used. Nevertheless, to help explain the invention, one particular seal which has been used successfully will be described. The elastomeric rings 30-36 are made of nitrile rubber and have the following dimensions: outside diameter 1.870 inches, inside diameter 1.505 inches, and thicknesses as follows:

ring 30—0.094 inch
ring 31—0.047 inch
ring 32—0.032 inch
ring 33—0.023 inch
ring 34—0.019 inch
ring 35—0.016 inch
ring 36—0.014 inch The metal rings are 0.030 inch thick and have the same inside and outside diameters as the rubber rings.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A multilayer seal comprising a stack of rings, some of said rings being made of elastomeric material and some being made of more rigid material, the elastomeric and rigid rings alternating in the axial direction of the stack, each of said rigid rings being discrete and the seal being devoid of rigid force transmitting means between said rigid rings, each of said elastomeric rings being discrete and unconnected to any other elastomeric ring outside of the rigid rings which separate them, and the elastomeric rings being progressively thinner in the axial direction of the stack.

2. A multilayer seal as defined in claim 1 wherein each ring is bonded to the next successive ring in the stack.

3. A multilayer seal as defined in claim 1 wherein the two end rings of the stack are of rigid material.

4. A multilayer seal as defined in claim 1 wherein each of said rings has a rectangular cross-sectional shape.

5. A multilayer seal as defined in claim 1 wherein the rigid material is a metal.

6. A multilayer seal as defined in claim 1 in combination with means for applying a resilient axial compressive load to the multilayer seal.

7. A multilayer seal as defined in claim 1 in combination with two opposed surfaces, there being a differential in fluid pressure between the opposite ends of said opposed surfaces, and the multilayer seal being between said opposed surfaces with the thickest of said elastomeric rings being closest to the higher pressure end of said opposed surfaces.

* * * * *